US008918023B2

(12) United States Patent
Nozaki et al.

(10) Patent No.: US 8,918,023 B2
(45) Date of Patent: Dec. 23, 2014

(54) TRANSMISSION MECHANISM AND IMAGE FORMING APPARATUS EMPLOYING THE SAME

(71) Applicants: Takahiro Nozaki, Nagoya (JP); Yasuhiro Suzuki, Nagoya (JP)

(72) Inventors: Takahiro Nozaki, Nagoya (JP); Yasuhiro Suzuki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/945,341

(22) Filed: Jul. 18, 2013

(65) Prior Publication Data

US 2014/0020489 A1   Jan. 23, 2014

(30) Foreign Application Priority Data

Jul. 20, 2012   (JP) .................................. 2012-161626

(51) Int. Cl.
*G03G 15/00* (2006.01)
*G03G 21/16* (2006.01)
*F16H 3/20* (2006.01)
*F16H 3/34* (2006.01)

(52) U.S. Cl.
CPC .. *F16H 3/20* (2013.01); *F16H 3/34* (2013.01); *G03G 21/1647* (2013.01)
USPC ............................................ 399/167; 74/352

(58) Field of Classification Search
CPC ....................................................... F16G 3/003
USPC .............................. 399/167; 74/352–354, 404
See application file for complete search history.

(56) References Cited

U.S. PATENT DOCUMENTS

| | | | | |
|---|---|---|---|---|
| 4,137,789 A | * | 2/1979 | Herleth | 74/404 |
| 4,812,065 A | * | 3/1989 | Shimogawara et al. | 400/624 |
| 5,150,630 A | * | 9/1992 | Kida et al. | 74/354 |
| 5,956,152 A | | 9/1999 | Yamada et al. | |
| 5,970,822 A | * | 10/1999 | Jung et al. | 74/810.1 |
| 7,306,216 B2 | * | 12/2007 | Lee et al. | 271/10.01 |
| 8,417,155 B2 | * | 4/2013 | Fukushima et al. | 399/167 |
| 2004/0034952 A1 | * | 2/2004 | Ho et al. | 15/48.1 |
| 2007/0240594 A1 | * | 10/2007 | Kim et al. | 101/244 |
| 2009/0035041 A1 | * | 2/2009 | Yang | 399/401 |
| 2009/0279933 A1 | * | 11/2009 | Kawamura et al. | 400/579 |

FOREIGN PATENT DOCUMENTS

| | | |
|---|---|---|
| JP | 09-242843 | 9/1997 |
| JP | 09-307702 | 11/1997 |
| JP | 2002-372146 A | 12/2002 |
| JP | 2007-017777 A | 1/2007 |
| JP | 2010-053948 A | 3/2010 |

\* cited by examiner

*Primary Examiner* — Clayton E Laballe
*Assistant Examiner* — Leon W Rhodes, Jr.
(74) *Attorney, Agent, or Firm* — Banner & Witcoff, Ltd.

(57) ABSTRACT

A transmission mechanism has an input gear, a first intermediate gear configured to engage with the input gear. A rotation shaft of the first intermediate gear is movable between a first position and a second position along an elongated hole formed on a supporting member. A first output gear is configured to engage with the first intermediate gear when the rotation shaft is located at the first position, and a second output gear configured to engage with the first intermediate gear when the rotation shaft is located at the second position. The rotation shaft can be located at a third position which is an intermediate position between the first position and the second position, the first intermediate gear engaging with both the first output gear and the second output gear when the rotation shaft is located at the third position.

13 Claims, 6 Drawing Sheets

TRANSMISSION MECHANISM AND IMAGE FORMING APPARATUS EMPLOYING THE SAME

CROSS-REFERENCE TO RELATED APPLICATION

This application claims priority under 35 U.S.C. §119 from Japanese Patent Application No. 2012-161626 filed on Jul. 20, 2012. The entire subject matter of the application is incorporated herein by reference.

BACKGROUND

1. Technical Field

Aspects of the present invention relate to a transmission mechanism and an image forming apparatus employing such a transmission mechanism.

2. Prior Art

Conventionally, a transmission mechanism having an input gear and an intermediate gear which engages with the input gear to transmit a driving force has been known. It is also known that such an intermediate gear is configured to be rockable so that the intermediate gear is connected to or disconnected from the input gear, or the intermediate gear, which engages with the input gear, is selectively connected to different gears, thereby switching drive force transmission paths.

In such conventional art, a coil spring is typically provided to urge the intermediate gear in its axial direction so that a self-rotation is restricted by a frictional force generated by the coil spring and the intermediate gear rocks (i.e., makes an orbital movement).

SUMMARY OF THE INVENTION

Aspects of the present invention provide a configuration of a rockable intermediate gear different from the conventional configuration.

According to aspects of the invention, there is provided a transmission mechanism, which has an input gear, a first intermediate gear configured to engage with the input gear. A rotation shaft of the first intermediate gear is movable between a first position and a second position along an elongated hole formed on a supporting member. A first output gear is configured to engage with the first intermediate gear when the rotation shaft is located at the first position, and a second output gear configured to engage with the first intermediate gear when the rotation shaft is located at the second position. The rotation shaft can be located at a third position which is an intermediate position between the first position and the second position, the first intermediate gear engaging with both the first output gear and the second output gear when the rotation shaft is located at the third position.

According to aspects of the invention, there is also provided an image forming apparatus, which has an image forming unit configured to form images on a printing sheet and a transmission mechanism configured to transmit a driving force to the image forming unit. The transmission mechanism has an input gear, a first intermediate gear configured to engage with the input gear. A rotation shaft of the first intermediate gear is movable between a first position and a second position along an elongated hole formed on a supporting member. A first output gear is configured to engage with the first intermediate gear when the rotation shaft is located at the first position, and a second output gear configured to engage with the first intermediate gear when the rotation shaft is located at the second position. The rotation shaft can be located at a third position which is an intermediate position between the first position and the second position, the first intermediate gear engaging with both the first output gear and the second output gear when the rotation shaft is located at the third position.

DESCRIPTION OF THE EMBODIMENT

Hereinafter, an embodiment according to the present invention will be described. It should be noted that the embodiment described below is only an exemplary embodiment, and the invention should not be limited to the configurations, mechanism and the like of the embodiment.

In the following description, an electrophotographic image forming apparatus capable of printing a color image is described as an embodiment of the present invention, with referring to the accompanying drawings.

1. Image Forming Apparatus

Figure 1:
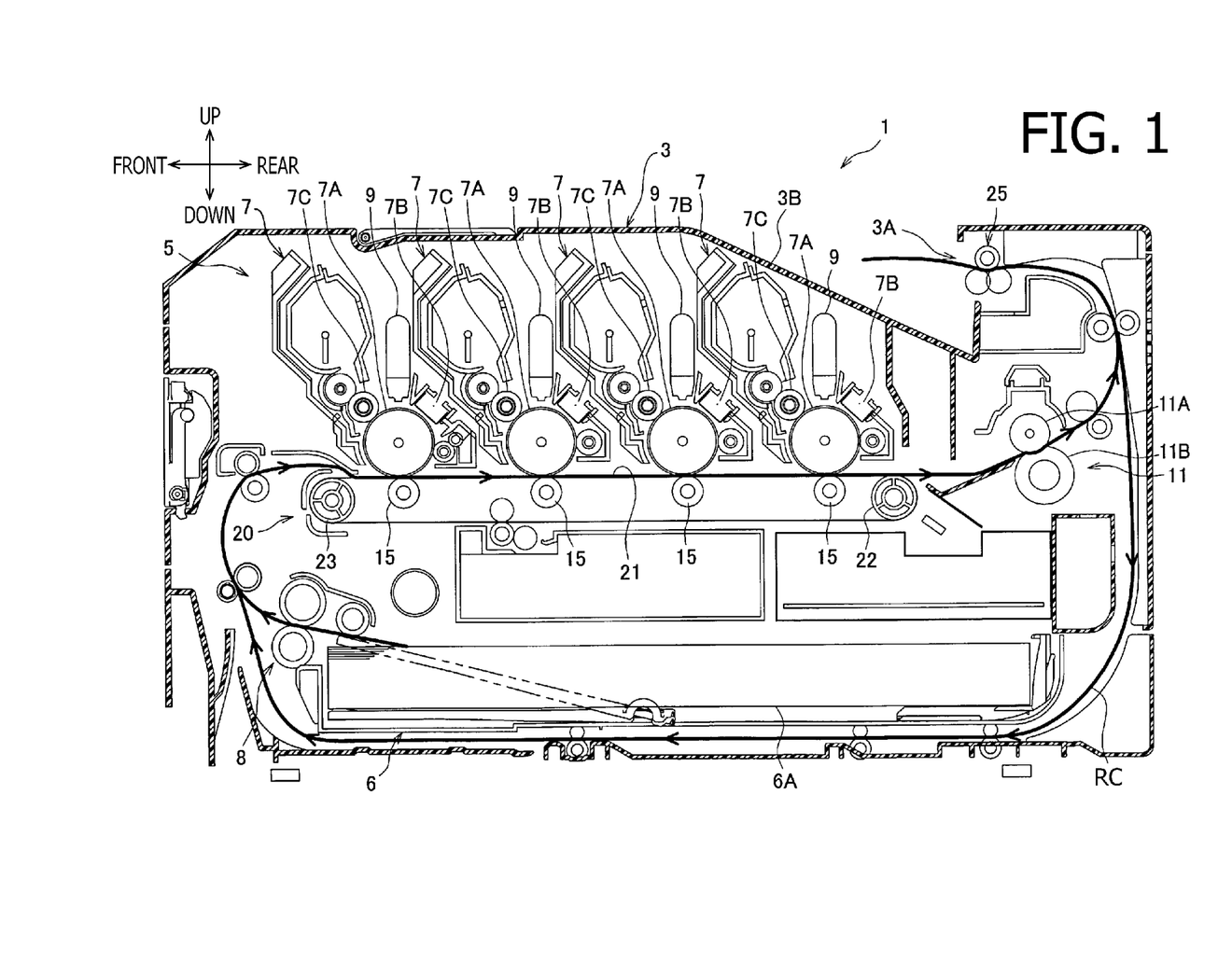
FIG. 1 is a cross-sectional view of an image forming apparatus according to aspects of the invention.

An image forming apparatus 1 has a body 3 which accommodates an image forming device 5 configured to form images on a printing sheet. The image forming device 5 employs an electrophotographic image forming method, which transfer developing agent of the sheet. The image forming device 5 is provided with a process unit 7, an exposure unit 9 and a fixing unit 11.

According to the embodiment, the image forming device 5 is configured as a so-called direct tandem type image forming device, and is provided with a plurality of process units 7 (e.g., four process units) which are serially arranged in a sheet feed direction.

The plurality of process units 7 have substantially the same structure and only the colors of the developing agents are different. Specifically, each process unit 7 has a photoconductive drum 7A which is configured to bear a developing agent, a charging unit 7B configured charge the photoconductive drum 7A and a developing roller 7C which supplies the developing agent to the photoconductive drum 7A.

The charged photoconductive drum 7 is exposed to light which corresponding to an image to be formed by an exposure unit 9, thereby an electrostatic latent image corresponding the image to be formed is formed on the surface of the photoconductive drum 7A. Then, when the developing agent is supplied onto the surface of the photoconductive drum 7A, the developing agent is attracted thereon at a position corresponding to the electrostatic latent image. The developing agent attracted on the photoconductive drum 7A will be transferred on the sheet.

At positions opposite to the photoconductive drums 7A with a transfer belt therebetween, transfer unit 15 are arranged. The transfer unit 15 are configured to cause the developing agent carried by the photoconductive drums 7A to be transferred on the sheet. Specifically, the developing agents carried by the photoconductive drums 7A are transferred on the sheet as it is fed on the transfer belt 21 in a overlapped manner.

The fixing unit 11 has a heat roller 11A configured to apply heat to the developing agent transferred on the sheet and rotate, and a pressure roller 11B which urges the sheet toward the heat roller 11A. Thus, the developing agent transferred on the sheet is fixed thereon as heated and pressed by the fixing unit 11.

The sheet ejected from the fixing unit 11 is fed such that its feeding direction is changed by 180 degrees and ejected on a sheet ejection tray 3B through an ejection opening 3A formed at an upper portion of the body.

On a lower side of the belt unit 20, a sheet feed tray 6 having a sheet placing section 6A at which a stack of sheets are to be placed is arranged. The sheets placed in the sheet placing section 6A are fed, by a sheet feeding mechanism 8, one by one toward the image forming unit 5.

The belt unit 20 has the transfer belt 21, a driving roller 22, a driven roller 23. The driving roller 22 and the driven roller 23 are supported by a frame (not shown).

The belt unit 20 and the sheet feed tray 6 are detachably attached to the body of the image forming device. That is, a user can detach/attach the belt unit 20 and the sheet feed tray 6 from/to the body of the image forming apparatus 1.

The image forming apparatus 1 has a duplex printing function (i.e., capable of printing images both front and back sides of a sheet). When the duplex printing is performed, a sheet having an image formed on the front side is fed to the image forming unit 5 again so that another image is formed on the back side of the sheet.

The ejection unit 3A has an ejection roller 25. A rotation direction of the ejection roller 25 can be switched between a case where the sheet fed from the fixing unit 11 is ejected on the ejection tray 3B and a case where the feeing direction of the sheet is reversed.

When a simplex printing (i.e., an image is formed only on one side of the sheet) is performed, the ejection roller 25 is rotated so that the sheet fed from the fixing unit 11 is fed in the same direction and ejected on the ejection tray 3B. Thus, the sheet having an image only on the front side is ejected on the ejection tray 3B.

When the duplex printing is performed, the rotation direction of the ejection roller 25 is reversed when a predetermined period of time has passed since a trailing end of the sheet, of which the image has been formed on the front side, has left the fixing unit 11.

When the feeding direction of the sheet is reversed, it is fed to the image forming unit 5 through the re-feeding path. After image formation on the back side of the sheet has been finished, the sheet is ejected on the ejection tray 3B, the feeding direction being not reversed any more.

2. Transmission of Driving Force

Figure 2:
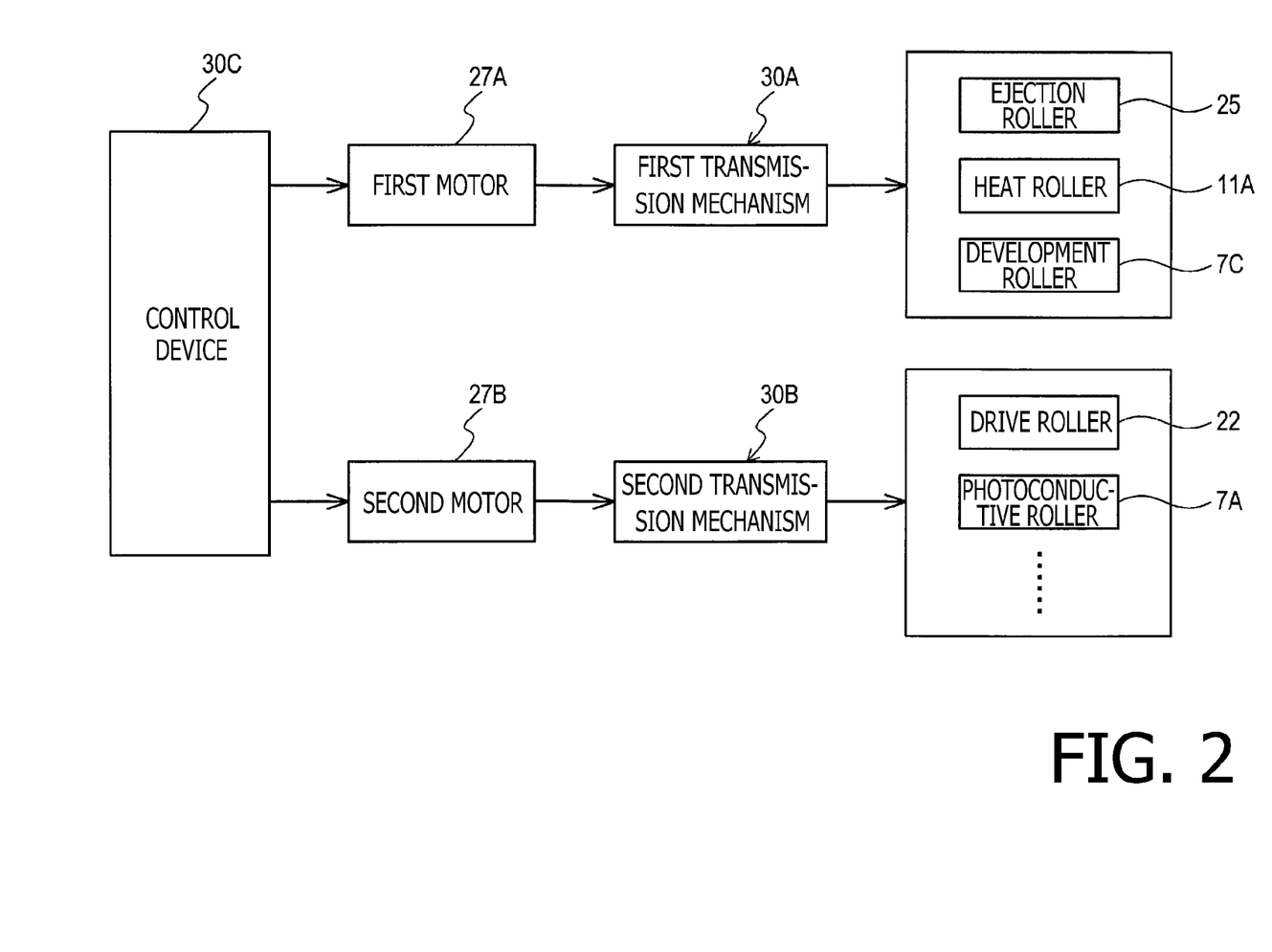
FIG. 2 is a chart illustrating transmission paths of a driving force.

A driving force generated by the first motor 27A is transmitted to the ejection roller 25, the heat roller 11A, the developing roller 7C and the like, through the first transmission mechanism 30A (see FIG. 2). A driving force generated by the second motor 27B is transmitted to the drive roller 22, the photoconductive drum 7A and the like, through the second transmission mechanism 30B.

A rotation direction of the ejection roller 25 is changed as a rotation direction of the first motor 27A is changed. In the following description, a rotation direction of the first motor 27A when the ejection roller 25 is rotated to eject the sheet on the ejection tray 3B will be referred to as a forward direction, and an opposite direction will be referred to as a reverse direction.

When the simplex printing is performed, the first motor 27A rotates in the forward direction. The first motor 27A stops rotating when the sheet is ejected on the ejection tray 3B and the printing is finished.

When the duplex printing is performed, the first motor 27A firstly rotates in the forward direction. Thereafter, the first motor 27A rotates in the reverse direction. Further, the rotation direction is changed again and the first motor 27A rotates in the forward direction, and stops rotating when the sheet is ejected on the ejection tray 3B and printing is finished.

Rotation and stoppage of rotation, forward/reverse rotations of the first and second motors 27A and 27B are controlled by a control unit 30C. The control unit 30C is composed of a microcomputer having well-known CPU (central processing unit), ROM (read only memory), RAM (random access memory) and the like. Control programs are stored in a non-volatile storage such as the ROM.

Each of the first transmission mechanism 30A and the second transmission mechanism 30B includes a plurality of gears. Aspects of the present invention are applied to the first transmission mechanism 30A.

Figure 3:
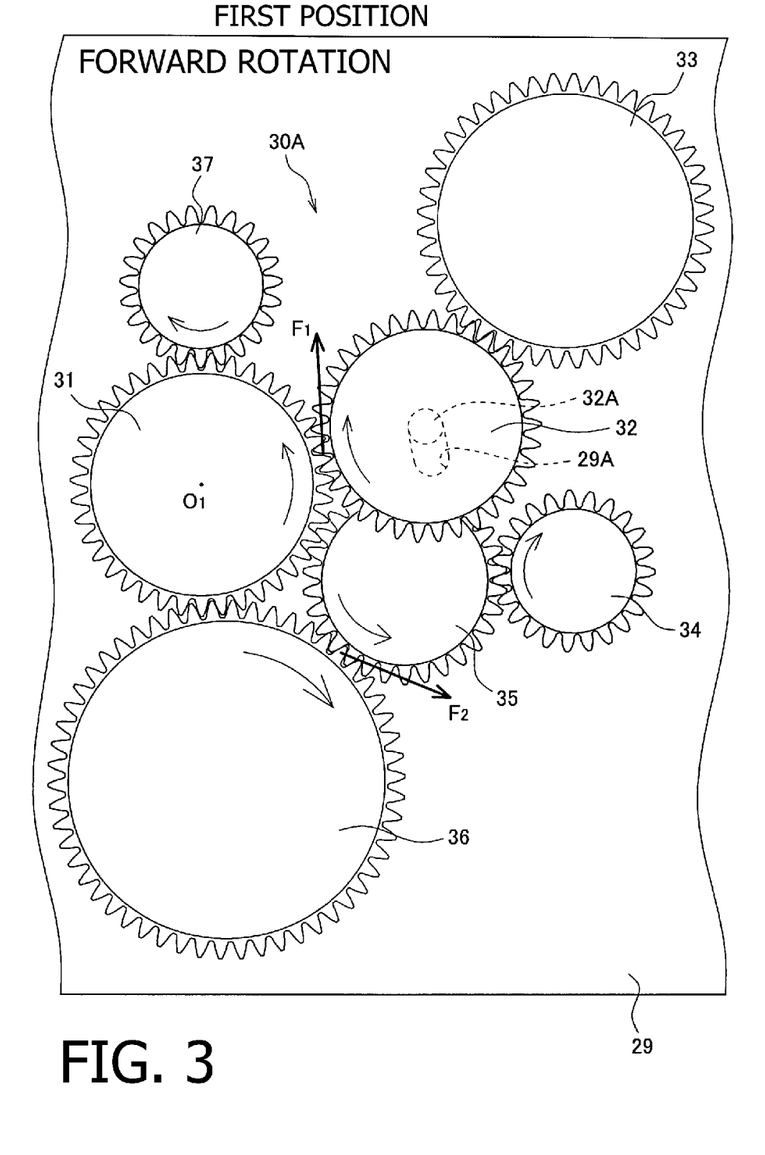
FIG. 3 schematically shows a first gear transmission mechanism at a forward rotation state.

The first transmission mechanism 30A has at least an input gear 31, a first intermediate gear 32, a first output gear 33, a second output gear 34, and a supporting member 29 that supports the gears 31-34.

According to the exemplary embodiment, the supporting member 29 has a main frame which constitutes a part of the body of the image forming apparatus 1, and a cover frame (not shown) which is provided on an opposite side of the main frame with the gears 31-34 are located therebetween.

The gears 31-34 are sandwiched between the main frame and the cover frame, and rotatably supported thereby.

According to the embodiment, the main frame has plate-like resin (e.g., POM: polyoxymethylene) members, which are arranged on both sides, in the horizontal direction, of the image forming unit 5. The cover frame is made of metal (e.g., SPCC: steel plate cold commercial). The cover frame is secured to the main frame with a mechanical fastening member such as a screw.

To the input gear 31, the driving force transmitted from the first motor 27A is input. According to the exemplary embodiment, the input gear 31 starts/stops rotating synchronously with the rotation of the first motor 27A. That is, if the rotation direction of the first motor 27A is reversed, the rotation direction of the input gear 31 is reversed synchronously with the rotation of the first motor 27A.

Figure 4:
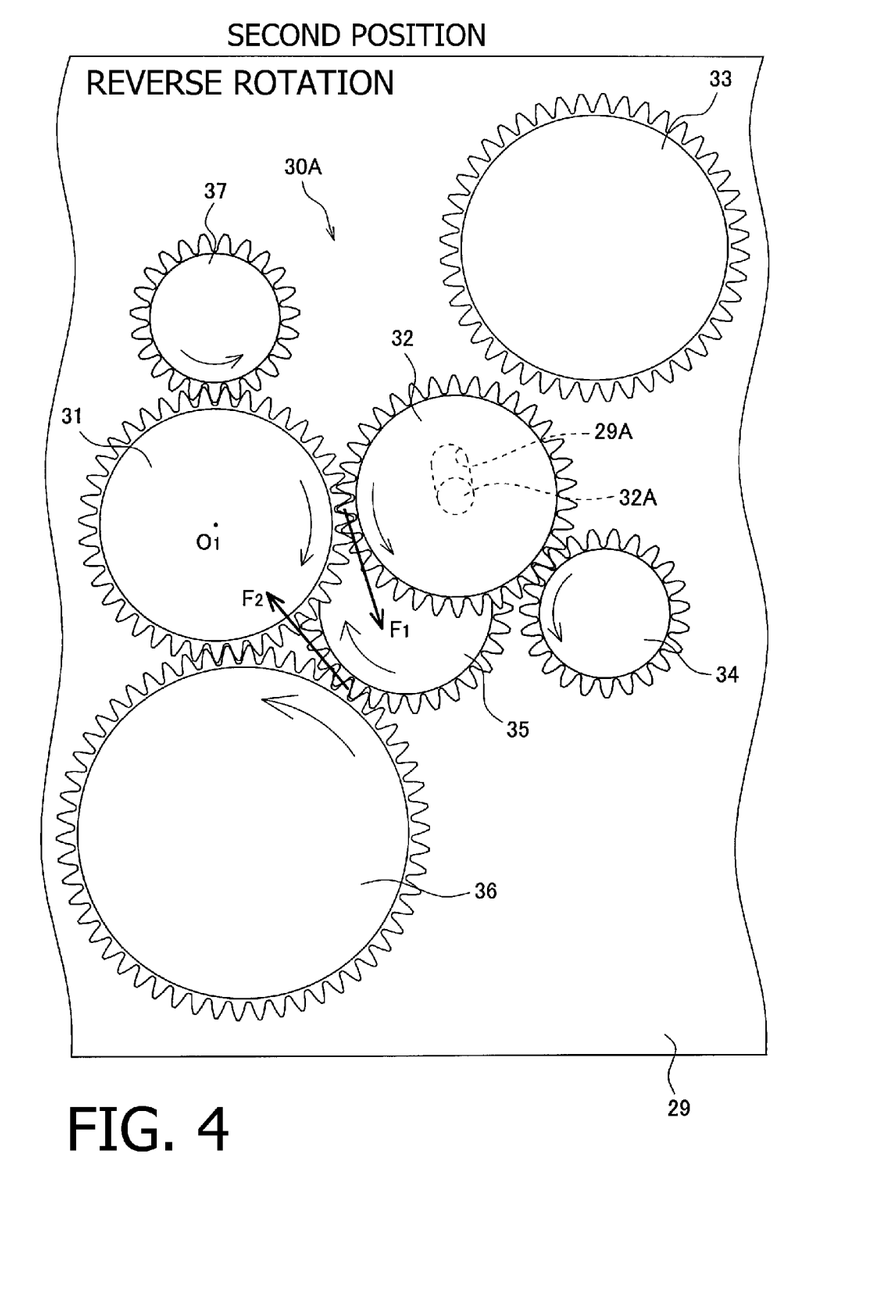
FIG. 4. schematically shows a first gear transmission mechanism at a reverse rotation state.

The first intermediate gear 32 is a gear which always engages with the input gear 31. As shown in FIGS. 3 and 4, a rotary shaft 32A is movable between a first position (as shown in FIG. 3) and a second position (as shown in FIG. 4).

The first intermediate gear 32 is supported by an elongated hole 29A formed on the supporting member 29 such that it can rotate and orbitally move. In other words, the circumferential surface of the shaft 32A slidably contacts the inner surface of the elongated hole 29A, which allows a rotation and an orbital movement of the first intermediate gear 32.

It is noted that, in the description, the orbital movement of the first intermediate gear 32 is a movement of the first intermediate gear 32 about a rotational center O1 of the input gear 31. Further, a rotation of the first intermediate gear 32 is a rotation of the first intermediate gear 32 about the shaft 32A as the first intermediate gear 32 engages with the input gear 31.

The shape of the elongated hole 29A in its longitudinal direction, that is a locus of the shaft 32A from the first position to the second position is an arc with the center O1 of the input gear 31 as a center of the curvature. Thus, the first intermediate gear 32 makes the orbital movement about the center O1.

The first output gear 33 transits the driving force to the heat roller 11A of the fixing unit 11. The first output gear 33 engages with the first intermediate gear 32 and rotates when the shaft 32A is located at the first position.

Thus, the heat roller 11A rotates by the driving force from the first motor 27A when the shaft 32A is located at the first position. When the shaft 32A is located at the second position, the first intermediate gear 32 disengages from the first output gear 33. In this state, the heat roller 11A does not rotate.

The second output gear 34 transmits the driving force to the developing roller 7C. The second output gear 34 rotates as it engages with the first intermediate gear 32, as shown in FIG. 4, when the shaft 32A is located at the second position. When the shaft 32A is located at the first position, the second output gear 34 engages with the second intermediate gear 35 as shown in FIG. 3.

The second intermediate gear 35 always engages with the driving gear 36. The driving gear 36 rotates by the driving force from the first motor 27A, and transmits the driving force to the input gear 31 and the second intermediate gear 35.

It is noted that a rotary shaft of the second intermediate gear 35 is supported in an elongated hole similarly to the shaft 32A, which is supported in the elongated hole 29A. Since the configurations are similar, a description regarding the second intermediate gear 35 is omitted for brevity. It is noted that the elongated hole supporting the shaft of the second intermediate gear is also an arc with the rotary center of the driving gear 36 as the center of the curvature.

With the above configuration, the second intermediate gear 35 can be located at a position where it engages with the second output gear 34 (see FIG. 3), which will be referred to as a fourth position, and a position where it disengages from the second output gear 34 (see FIG. 4), which will be referred to as a fifth position. In other words, the second intermediate gear 35 makes an orbital movement between the fourth position and the fifth position.

Further, a side face of the second intermediate gear 35 is urged in the axial direction by an urging member such as a coil spring (not shown). That is, the second intermediate gear 35 is applied with a frictional forth which restricts a self-rotation of the second intermediate gear 35.

It is noted that the second output gear 34 is configured such that a portion engaging with the first intermediate gear 32 and another portion engaging with the second intermediate gear 35 are shifted in the axial direction. Similarly, the driving gear 36 is formed such that a portion engaging with the input gear 31 and another portion engaging with the second intermediate gear 35 are shifted in the axial direction.

Further, the third output gear 37 rotates, by the driving force from the input gear 31 and synchronously therewith, and transmits the driving force to the ejection roller 25. That is, when the rotation direction of the first motor is reversed, the rotation direction of the ejection roller 25 is also reversed synchronously.

3. First Transmission Mechanism
<Forward Movement>
When the first motor 37A continuously rotates forwardly, for example, more than one second after the first motor started rotating forwardly, the shaft 32A is located at the first position as shown in FIG. 3, and the first intermediate gear 32 engages with the first output gear 33, and the second intermediate gear 35 engages with the second output gear 34.

That is, when the first motor 37A rotates forwardly, the driving force output by the first motor 27A is transmitted to:
(1) the first output gear 33 through the driving gear 36, the input gear 31 and the intermediate gear 32;
(2) the third output gear 37 through the driving gear 36 and the input gear 31; and
(3) the second output gear 35 through the driving gear 36 and the second intermediate gear 35.

<Reverse Movement>
When the first motor 37A continuously rotates reversely, for example, more than one second after the first motor started rotating reversely, the shaft 32A is located at the second position as shown in FIG. 4, the first intermediate gear 32 engages with the second output gear 34 and the second intermediate gear 35 disengages from the second output gear 34.

That is, when the first motor 37A rotates reversely, the driving force output by the first motor 27A is transmitted to:
(1) the second output gear 34 through the driving gear 36, the input gear 31 and the first intermediate gear 32; and
(2) the third output gear 37 through the driving gear 36 and the input gear 31.

Thus, when the first motor 37A rotate reversely, the driving force is not transmitted to the first output gear 33, and thus, the heat roller 11A.

When the input gear 31 rotates, the first intermediate gear 32 receives an engaging pressure which is generated at a portion where the input gear 31 engages with the first intermediate gear 32 (hereinafter, such an engaging pressure will be referred to as a first engaging pressure F1). The first engaging pressure F1 when the first motor 27A rotates forwardly has a component directed from the second position to the first position, as shown in FIG. 3. The first engaging pressure F1 when the first motor 27A rotates reversely has a component directed from the first position to the second position as shown in FIG. 4.

The first engaging pressure F1 applied to the first intermediate gear 32 works as a force to make the first intermediate gear 32 self-rotate, and a force to make the orbital movement of the first intermediate gear 32. Hereinafter, the former will be referred to as a self-rotation force, and the latter will be referred to as an orbital movement force. If a force to obstacle the orbital movement force is applied to the first intermediate gear 32, and the self-rotation force becomes greater than the orbital movement force, the first intermediate gear 32 makes the self-rotation and does not make the orbital movement. If a force to obstacle the self-rotation is applied to the first intermediate gear 32 and the orbital movement force becomes greater than the self-rotation force, the first intermediate gear 32 moves in the direction of the component F1 described above.

That is, if the first motor 27A continuously rotates in the forward direction, the shaft 32A is urged to be located at the first position within the elongated hole 29A by the component F1 as shown in FIG. 3, and the orbital movement of the first intermediate gear 32 is prevented. Therefore, when the first motor 27A is continuously rotating in the forward direction, the first intermediate gear 32 does not make the orbital movement, but stays at the first position and makes the self-rotation.

If the first motor 27A continuously rotates in the reverse direction, the shaft 32A is urged to be located at the second position within the elongated hole 29A by the component F1 as shown in FIG. 4, and the orbital movement of the first intermediate gear 32 is prevented. Therefore, when the first motor 27A is continuously rotating in the reverse direction, the first intermediate gear 32 does not make the orbital movement, but stays at the second position and makes the self-rotation.

When the driving gear 36 rotates, similar to the first intermediate gear 32, the second intermediate gear 35 receives an engaging pressure (hereinafter, referred to as a second engaging pressure F2) which is generated at a portion where the driving gear 36 engages with the second intermediate gear 35. When the first motor 27A rotates in the forward direction, the second engaging pressure F2 includes a component which is directed from the fifth position to the fourth position as shown in FIG. 3. When the first motor 27A rotates in the reverse direction, the second engaging pressure F2 includes a component which is directed from the fourth position to the fifth position as shown in FIG. 4.

Therefore, when the first motor 27A continuously rotates in the forward direction, the second intermediate gear 35 stays at the fourth position and makes the self-rotation. When the first motor 27A continuously rotates in the reverse direction, the second intermediate gear 35 stays at the fifth position and makes the self-rotation.

<From Forward Rotation to Reverse Rotation>

Figure 5:
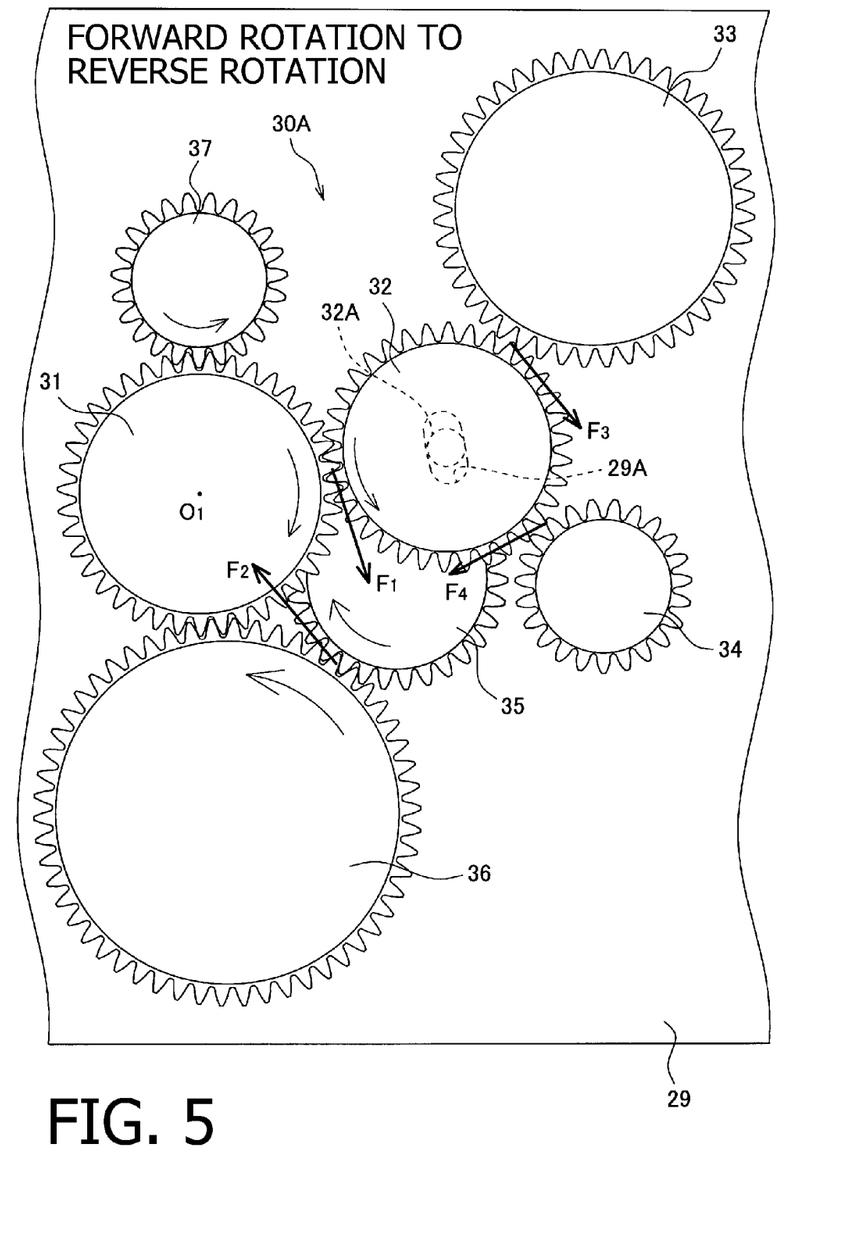
FIG. 5 schematically shows the first gear transmission mechanism when the forward rotation state is changed to the reverse rotation state.

When the continuous rotation, in the forward direction, of the first motor 27A is switched to the reverse rotation, the direction of the first engaging force F1 is changed to the opposite direction. Therefore, the orbital movement force that urges the shaft 32A to the first position disappears, and the orbital movement force that moves the shaft 32A toward the second position 32A is generated.

According to the exemplary embodiment, as shown in FIG. 5, when the shaft 32A is located at a third position, which is an intermediate position between the first and second positions, the first intermediate gear 32 engages with both the first output gear 33 and the second output gear 34.

Therefore, when the intermediate gear 32 is located at the third position when the rotation direction of the first motor 27A is changed from the forward rotation to the reverse rotation, an engaging pressure generated at a portion where the first intermediate gear 32 engages with the first output gear 33 (which will be referred to as a third engaging pressure F3) is applied to the first intermediate gear 32 as a component directed from the first position toward the second position, similar to the first engaging pressure F1. It is noted that the third engaging pressure F3 is generated by a rotational resistance applied to the first output gear 33, that is, a load to the first output gear 33.

When the intermediate gear 32 is located at the third position when the rotation direction of the first motor 27A is changed from the forward rotation to the reverse rotation, an engaging pressure generated at a portion where the first intermediate gear 32 engages with the second output gear 34 (which will be referred to as a third engaging pressure F4) is applied to the first intermediate gear 32 as a component that makes the first intermediate gear 32 in the forward direction. It is noted that the fourth engaging pressure F4 is generated by a rotational resistance applied to the second output gear 33, that is, a load to the second output gear 34.

Therefore, when the first intermediate gear 32 is located at the third position as the rotation direction of the first motor 27A is changed from the forward rotation to the reverse rotation, the first engaging pressure F1 and the third engaging pressure F3 function as forces to make the orbital movement of the first intermediate gear 32 toward the second position, while the fourth engaging pressure F4 functions as the force preventing the self-rotation of the first intermediate gear 32.

As a result, the orbital rotation force for moving the first intermediate gear 32 toward the second position is greater than the self-rotation force, and the first intermediate gear 32 moves toward the second position.

When the shaft 32A reaches the second position of the elongated hold 29A, the first intermediate gear 32 disengages from the first output gear 33, as shown in FIG. 3, so that the third engaging pressure F3 disappears, and the orbital movement of the first intermediate gear 32 is restricted. At this state, the first intermediate gear 32 self-rotates as it stays with the shaft 32A staying at the second position.

It is noted that the third position is the intermediate position of the locus of the shaft 32A from the first position to the second position. That is, a moving amount of the shaft 32A from the third position to the first position, and a moving amount of the shaft 32A from the third position to the second position are substantially the same.

To the second intermediate gear 35, a force preventing the self-rotation is always applied by the coil spring. Therefore, the second intermediate gear 35 makes the orbital movement to move away from the second output gear 34 by the second engaging pressure F2.

<From Reverse Rotation to Forward Rotation>

Figure 6:
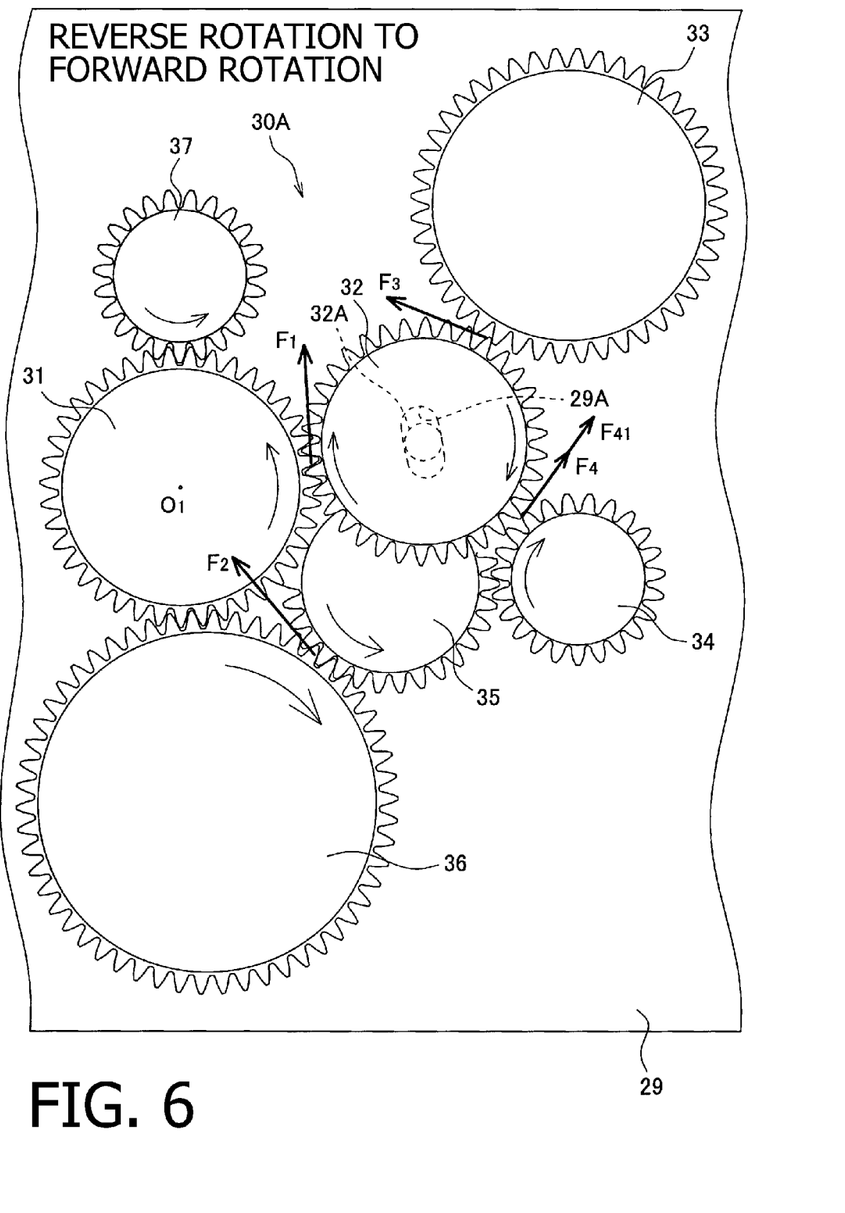
FIG. 6 schematically shows the first gear transmission mechanism when the reverse rotation state is changed to the forward rotation state.

When the rotation direction of the first motor 27A is changed from the reverse direction to the forward direction, the direction of the first engaging pressure F1 is changed to the opposite direction.

Therefore, the orbital movement force that urges the shaft 32A at the second position disappears, and the orbital movement force to move the shaft 32A toward the first position is generated. Therefore, analogous to a case where the rotation direction of the first motor 27A is changed to the forward direction to the reverse direction, the shaft 32A moves to the first position.

As shown in FIG. 6, the third engaging pressure F3 at the third position when the rotation direction of the first motor 27A is changed from the reverse direction to the forward direction is applied to the first intermediate gear 32 as a force having a component directed from the second position toward the first position. The fourth engaging pressure F4 at the third position when the rotation direction of the first motor 27A is changes from the reverse direction to the forward direction is applied to the first intermediate gear 32 as a force that makes the first intermediate gear 32, which is rotating forwardly, rotate reversely.

Thus, at the third position when the rotation of the first motor 27A is changed from the reverse rotation to the forward rotation, the first engaging pressure F1 and the third engaging pressure F3 function as the forces that move the first intermediate gear 32 toward the first position, and the fourth engaging pressure F4 functions as a force preventing the self-rotation of the first intermediate gear 32. Therefore, the orbital movement force to move the first intermediate gear 32 toward the first position is greater than the self-rotation force, and the first intermediate gear 32 moves toward the first position side.

When the shaft 32A reaches the first position within the elongated hole 29A, the first intermediate gear 32 disengages from the second output gear 34 and the third engaging pressure F3 disappears, as shown in FIG. 3, and the orbital movement of the first intermediate gear 32 is prevented. Thus, the first intermediate gear 32 stays at the first position and self-rotates.

Since the force to prevent the self-rotation of the second intermediate gear 35 with the coil spring is always applied to the second intermediate gear 35. Therefore, the second intermediate gear 35 makes the orbital movement, by the second engaging pressure F2, in a direction where the second intermediate gear 35 engages with the second output gear 34.

The exemplary embodiment is configured such that, at least when the rotation of the first motor 27A is changed from the reverse rotation to the forward rotation and the shaft 32A of the first intermediate gear 32 is located at the third position, the intermediate gear 35 engages with the second output gear 34 (see FIG. 6).

Therefore, when the shaft 32A is located at the third position when it is moved from the second position to the first position, the second intermediate gear 35 engages with the second output gear 34 to rotate the second output gear 34 in a direction where the first intermediate gear 32 is reversely rotated.

If one of the first output gear 33 and the second output gear 34, which is located on a back side with respect to the moving direction of the shaft 32A when it is located at the third position is called as a back side gear, the second output gear 34 is the back side gear in a state shown in FIG. 6. In FIG. 6, the second intermediate gear 36 rotates the back side gear to rotate the first intermediate gear 32 in an opposite direction (i.e., a direction opposite to the current rotating direction).

4. Characteristic Features of the Exemplary Embodiment

As described above, according to the first transmission mechanism 30A, the first intermediate gear 32 can be moved without providing a coil spring which generates the frictional force to prevent the self-rotation of the first intermediate gear 32, different from the conventional art.

Therefore, according to the exemplary embodiment, loss of the force due to the frictional force of the coil spring of the conventional art, the driving force can be transmitted to outside efficiently. Further, a manufacturing cost of the first transmitting mechanism 30A can be reduced.

If the coil spring is employed, the frictional resistance is largely affected by the friction coefficient at the portion where the coil spring contacts the gear and/or the characteristics of the coil spring. Thus, if the intermittent transmission of the driving force and/or switching of the transmission paths is performed based on the frictional resistance of the coil spring, such a performance would be unstable.

According to the exemplary embodiment, since the shaft 32A can be located at the third position, and when the shaft 32A is located at the third position, the intermediate gear 32 engages with both the first output gear 33 and the second output gear 34. With this configuration, a force that prevents the self-rotation of the first intermediate gear 32 is applied to the first intermediate gear when the shaft 32A is moving between the first and second positions. Therefore, unstableness of switching the transmission paths due to uneven characteristics of coil spring and/or unevenness of the frictional indexes is suppressed, and it becomes possible to switch the driving force transmission paths unfailingly.

According to the exemplary embodiment, as described above, when the shaft 32A is located at the third position, at least one of the first output gear 33 and the second output gear 34 applies the force to prevent the self-rotation to the first intermediate gear 32 which is making the orbital movement.

It is noted that a state where "the first intermediate gear 32 engages with both the first output gear 33 and the second output gear 34" means that the force that prevents the self-rotation of the intermediate gear 32 is generated when the shaft 32A is located at the third position. Such a state could occur in cases (a)-(d) indicated below:

(a) a case where the teeth of the first intermediate gear 32 engage with the teeth of the first output gear 33 and the teeth of the second output gear 34;

(b) a case where the force that prevents the self-rotation of the first intermediate gear 32 is applied to the first intermediate gear 32 as tips of the teeth of the first output gear 33 and the tips of the teeth of the second output gear 34 contact each other;

(c) a case where the force that prevents the self-rotation of the first intermediate gear 32 is applied to the first intermediate gear 32 as the teeth of the first intermediate gear 32 engage with the teeth of the first output gear 33, and the tips of the teeth of the first intermediate gear 32 contact the tips of the teeth of the second output gear 34; or (d) a case where the force that prevents the self-rotation of the first intermediate gear 32 is applied to the first intermediate gear 32 as the teeth of the first intermediate gear 32 engage with the teeth of the second output gear 34, and the tips of the teeth of the first intermediate gear 32 contact the tips of the teeth of the first output gear 33.

It is one of the characteristic features in the exemplary embodiment that, when the shaft 32A is located at the third position, the back side gear is rotated such that the first intermediate gear 32 is reversely rotated.

With the above configuration, as shown in FIG. 6, an engaging pressure F41 is applied to the first intermediate gear 32 in addition to the fourth engaging pressure F4. It is noted that the engaging pressure F41 is the engaging pressure generated due to the driving force applied to the back side gear (i.e., the second output gear 34 according to the embodiment).

Therefore, when the shaft 32A is located at the third position, the force preventing the self-rotation applied to the first intermediate gear 32 becomes the largest, it is ensured that the orbital movement of the first intermediate gear 32 is made.

In the above-described exemplary embodiment, a portion of the second output gear 34 engaging with the first intermediate gear 32 and a portion thereof engaging with the second intermediate gear 35 are displaced in the axial direction. Further, a portion of the driving gear 36 engaging with the input gear 31 and a portion thereof engaging with the second intermediate gear 35 are displaced in the axial direction. Such a configuration is only an exemplary one, and the invention needs not be limited such a configuration, but can be modified in different ways. For example, a portion of the second output gear 34 engaging with the first intermediate gear 32 and a portion thereof engaging with the second intermediate gear 35 may be displaced in a rotational direction.

In the above-described exemplary embodiment, the second output gear 34 is defined as the back side gear, and is rotated to rotate the first intermediate gear 32 in the opposite direction. This configuration can be modified in various ways. For example, a mechanism that applies a driving force to the back side gear when the shaft 32A is located at the third position may be omitted. Alternatively, when the shaft 32A is located at the third position during the movement from the first position to the second position, the back side gear (the first output gear 33, in this state) may apply the engaging pressure F41 to the first intermediate gear 32.

In the above-described exemplary embodiment, by switching the rotation directions of the first motor 27A, the rotation direction of the input gear 31 is changed. However, the invention should not be limited to such a configuration. For example, the rotation direction of the input gear 31 may be changed by switching a driving force transmitting paths from the first motor 27A to the input gear 31.

In the above-described, the transmission mechanism according to aspects of the invention is applied to the image forming apparatus. It should be noted that, aspects of the invention need not be limited to such a configuration, and can be applied to, for example, a sheet feeding mechanism of an image scanning apparatus.

According to the above-described exemplary embodiment, a plurality of exposure units 9 are provided respectively corresponding to a plurality of photoconductive drums 7A. The invention needs not be limited to such a configuration, and a so-called scanner type exposure unit, which scans light for exposing the photoconductive drums 7A may be employed.

It should be noted that the present invention should meet the gist of the invention set forth as claims, and need not be limited to the configuration of the above-described exemplary embodiment.

What is claimed is:

1. A transmission mechanism, comprising:
   an input gear configured to receive a driving force of a forward direction and a driving force of a reverse direction;
   a first intermediate gear configured to engage with the input gear to rotate, a rotation shaft of the first intermediate gear being movable between a first position and a second position;
   a supporting member having an elongated hole which slidably receives the rotation shaft of the first intermediate gear;
   a first output gear configured to engage with the first intermediate gear to rotate when the rotation shaft is located at the first position; and
   a second output gear configured to engage with the first intermediate gear to rotate when the rotation shaft is located at the second position,
   wherein the rotation shaft can be located at a third position which is an intermediate position between the first position and the second position, the first intermediate gear engaging with both the first output gear and the second output gear when the rotation shaft is located at the third position.

2. The transmission mechanism according to claim 1, wherein the third position is an intermediate position of a locus of the rotation shaft moving between the first position and the second position.

3. The transmission mechanism according to claim 1, wherein the elongated hole is formed such that a longitudinal shape of the elongated hole is arc-shaped of which a center of a curvature is a rotation center of the input gear.

4. The transmission mechanism according to claim 1, further comprising:
   a motor configured to generate a driving force to be inputted to the input gear; and
   a control unit configured to change a rotation direction of the motor to move the rotation shaft between the first position and the second position.

5. The transmission mechanism according to claim 1, wherein a back side gear applies a rotating force to rotate the first intermediate gear in a direction opposite to a current rotating direction when the rotation shaft is located at the third position, the back side gear being one of the first output gear and the second output gear located on a back side in a moving direction of the rotation shaft.

6. The transmission mechanism according to claim 4, further comprising a second intermediate gear configured to engage with the second output gear to transmit the driving force to the second output gear when the rotation shaft of the first intermediate gear is located at the first position, and disengages from the second output gear when the rotation shaft is located at the second position, wherein the second intermediate gear applies a driving force to rotate the first intermediate gear in the reverse direction when the first intermediate gear is located at the third position during movement of the rotation shaft from the second position to the first position.

7. An image forming apparatus, comprising:
   an image forming unit configured to form images on a printing sheet; and
   a transmission mechanism configured to transmit a driving force to the image forming unit,
   the transmission mechanism including:
      an input gear configured to receive a driving force of a forward direction and a driving force of a reverse direction;
      a first intermediate gear configured to engage with the input gear to rotate, a rotation shaft of the first intermediate gear being movable between a first position and a second position;
      a supporting member having an elongated hole which slidably receives the rotation shaft of the first intermediate gear;
      a first output gear configured to engage with the first intermediate gear to rotate when the rotation shaft is located at the first position; and
      a second output gear configured to engage with the first intermediate gear to rotate when the rotation shaft is located at the second position,
      wherein the rotation shaft can be located at a third position which is an intermediate position between the first position and the second position, the first intermediate gear engaging with both the first output gear and the second output gear when the rotation shaft is located at the third position.

8. The image forming apparatus according to claim 7, wherein the image forming unit includes:
   a developing unit configured to form a developing agent image to be transferred onto a sheet; and
   a fixing unit configured to fix the image transferred on the sheet,
   wherein the first output gear is configured to transmit the driving force to the fixing unit, and
   wherein the second output gear is configured to transmit the driving force to the developing unit.

9. The image forming apparatus according to claim 8, wherein the third position is an intermediate position of a locus of the rotation shaft moving between the first position and the second position.

10. The image forming apparatus according to claim 8, wherein the elongated hole is formed such that a longitudinal shape of the elongated hole is arc-shaped of which a center of a curvature is a rotation center of the input gear.

11. The image forming apparatus according to claim 8, the transmission mechanism further comprising:
    a motor configured to generate a driving force to be inputted to the input gear; and
    a control unit configured to change a rotation direction of the motor to move the rotation shaft between the first position and the second position.

12. The image forming apparatus according to claim 8, wherein a back side gear applies a rotating force to rotate the first intermediate gear in a direction opposite to a current rotating direction when the rotation shaft is located at the third position, the back side gear being one of the first output gear and the second output gear located on a back side in a moving direction of the rotation shaft.

13. The image forming apparatus according to claim 11,
the transmission mechanism further comprising a second intermediate gear configured to engage with the second output gear to transmit the driving force to the second output gear when the rotation shaft of the first intermediate gear is located at the first position, and disengages from the second output gear when the rotation shaft is located at the second position,
wherein the second intermediate gear applies a driving force to rotate the first intermediate gear in the reverse direction when the first intermediate gear is located at the third position during movement of the rotation shaft from the second position to the first position.

* * * * *